Aug. 21, 1934.    W. VAN KESTEREN    1,970,827
LAWN EDGER
Filed Jan. 11, 1933
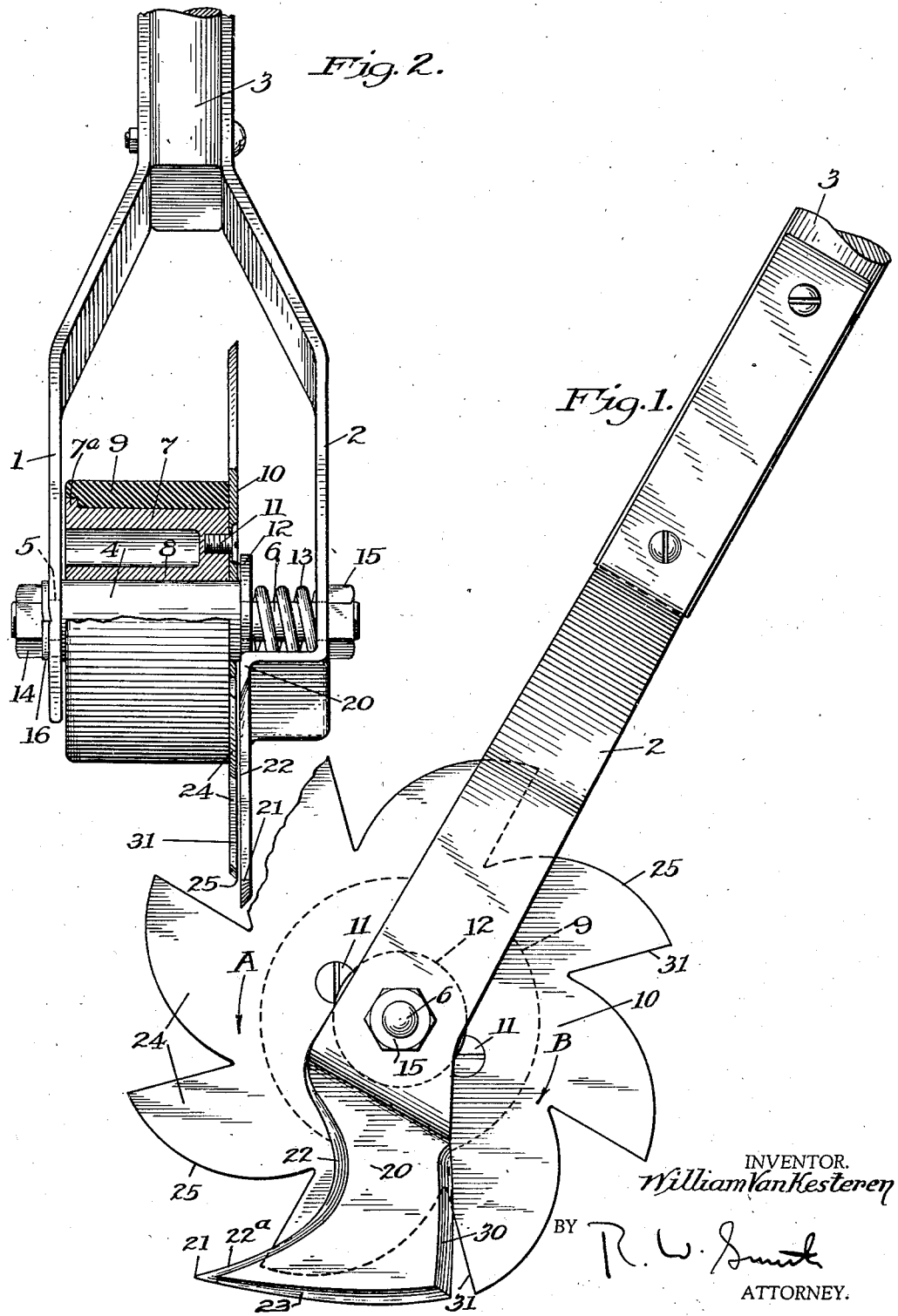
INVENTOR.
William Van Kesteren
BY R. W. Smith
ATTORNEY.

Patented Aug. 21, 1934

1,970,827

UNITED STATES PATENT OFFICE 1,970,827

LAWN EDGER

William Van Kesteren, Southgate, Calif.

Application January 11, 1933, Serial No. 651,118

2 Claims. (Cl. 97—227)

This invention is a tool adapted for propulsion along the edge of a lawn and having cooperating blades, one of which is stationary with relation to the tool and the other of which is adapted for rotation by traction of the tool, so as to produce a shearing action by the cooperating blades for trimming the edge of a lawn.

It is an object of the invention to plow along the edge of a lawn by means of the stationary blade projecting in advance of the point of shearing engagement with its cooperating rotary blade, and to then guide the grass at the edge of the lawn into position for shearing action by the cooperating blades.

It is a further object of the invention to provide the tool with a rotary guide element adapted to rest upon the ground for supporting the tool, and fixed relative to the rotary blade which preferably clears the bottom of the stationary blade, so as to adapt the rotary blade for free rotation, by traction of the rotary guide element.

It is a still further object of the invention to arrange the cooperating blades so as to produce a shearing action both when the tool is propelled forwardly for normal operation, and whenever the tool is periodically drawn rearwardly preparatory to going over the same work.

Further objects of the invention will be readily understood from the following description of the accompanying drawing, in which:

Fig. 1 is a side elevation of the tool.

Fig. 2 is a front elevation, partly in axial section.

The tool comprises a yoke supporting a transverse axle and having a handle of any desired length projecting upwardly therefrom, with a guide roller and a disk blade fixed relative to one another and journaled on the axle, and a stationary blade suspended from the yoke and cooperating with the disk blade at the side thereof which is remote from the guide roller.

As an instance of this arrangement the yoke may comprise arms 1—2 fixed at their upper ends to opposite sides of handle 3, and bowed outwardly toward their lower ends so as to form a fork in which transverse axle 4 is supported by projecting its reduced ends 5—6 outwardly through the lower ends of the respective yoke arms. Guide roller 7 has a hub 8 journaled on axle 4 so that the guide roller is adapted to rest upon the ground, and its outer periphery is preferably provided with a friction annulus 9 of rubber or the like gripping the roller 7 through the inherent resiliency of the friction annulus so that the annulus and roller rotate as one. Disk blade 10 is fixed to one end of hub 8 as shown at 11, longitudinally securing the friction annulus 9 between the disk blade and a flange 7ª which is provided at the opposite end of roller 7, and one end of axle 4 is adapted for end abutment against arm 1, with a washer 12 adapted for end abutment against the opposite end of the axle; and the rotary guide roller and disk blade are adapted for free rotation on the axle between said end abutments. A spring 13 is mounted on axle end 6 between washer 12 and arm 2, and nuts 14—15 are threaded onto the outwardly projecting axle ends 5—6, with a lock washer 16 preferably provided for nut 14, and the nut 15 locked by the spring 13 tensioning the arm 2 against the nut.

The arm 2 is bent inwardly below axle 4 and terminates in a depending blade 20 alongside the disk blade 10 and having a forwardly projecting plow point 21 at its lower end. The forward edge of blade 20 is a concave cutting edge 22 which at its lower end slopes forwardly and downwardly to the plow point 21 as shown at 22ª, and the lower edge of blade 20 is a slightly convex cutting edge 23 extending to the plow point 21. The disk blade 10 has a plurality of radially projecting blade elements 24 which at their rear edges form convex cutting edges 25 adapted for shearing cooperation with the concave cutting edge 22 of the stationary blade 20 when the blade 10 is rotated in the direction of arrow A of Fig. 1.

The rear edge of blade 20 may also form a cutting edge, shown as a substantially vertical slightly convex cutting edge 30, and if such a cutting edge is formed on blade 20, radial cutting edges 31 are formed at the forward edges of the blade elements 24 of the disk blade 10, and are adapted for shearing cooperation with cutting edge 30 when the blade 10 is rotated in the direction of arrow B of Fig. 1.

The spring 13 tends to laterally shift the blade 20 away from the blade 10, but this tendency is counteracted by tightening the nut 15 so as to provide a tensioned adjustment whereby the blades 10—20 may be relatively laterally adjusted so as to insure shearing engagement at the cooperating cutting edges 25—22 and 31—30, it being noted that the blade 20 may be thus laterally adjusted relative to blade 10 without the blade 20 necessarily bearing against the blade 10 for holding the latter in place, since the rotating blade 10 is independently held against axial play by means of the spring 13 retaining the abutment washer 12 against the end of axle 4.

In operation the roller 7 rests on the ground so as to position the blade 20 at the edge of a lawn which is to be trimmed, and the tool is pushed forwardly by its upwardly projecting handle, which is inclined rearwardly so that the blade 20 depends substantially vertically. The point 21 thus plows along the edge of the lawn, and the grass is guided by the cutting edge 22ª into position where it is sheared off between the cooperating cutting edges 25—22, it being noted that the traction of guide roller 7, which is assured by its friction annulus 9, freely rotates the disk blade 10 in the direction of arrow A to produce the desired shearing action. If an obstruction is met so that it is necessary to draw the tool rearwardly and then again push it forwardly in order to overcome the obstruction, or if throughout operation of the tool it is desired to make a practice of alternately forwardly propelling and then retracting the tool for going over the same work several times, the trimming action is continued throughout said movement of the tool, since when the tool is drawn rearwardly the traction of guide roller 7 turns the disk blade 10 in the direction of arrow B, thereby producing a shearing action at the cooperating cutting edges 31—30.

The invention thus provides a simple and compact tool, adapted to guide the cutting blades along the edge of a lawn so as to project the stationary blade to a fixed depth, and freely rotating the disk blade with relation to the stationary blade by traction of the guide roller, so that the cooperating blades provide a shearing action, both when the tool is propelled forwardly and when it is drawn rearwardly.

I claim:

1. In a lawn edger, cooperating blades adapted for movement along the edge of a lawn and adapted for relative rotation for cooperative shearing action, tensioning means tending to spread the blades apart, and means for relatively adjusting the blades against said tensioning means.

2. In a lawn edger, a forked frame, a blade rotatably mounted in the frame between the respective sides of the forked frame, a stationary blade at one side of the frame, the blades having cutting edges adapted for cooperative shearing action, a spring between the rotatable blade and the side of the frame which carries the stationary blade, said spring arresting axial play of the rotatable blade toward said side of the frame, and means for adjusting said side of the frame relative to the opposite side of the frame.

WILLIAM VAN KESTEREN.